(12) United States Patent
Izumi

(10) Patent No.: US 10,562,131 B2
(45) Date of Patent: Feb. 18, 2020

(54) LASER MACHINE

(71) Applicant: FANUC CORPORATION, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 15/874,466

(22) Filed: Jan. 18, 2018

(65) Prior Publication Data

US 2018/0200833 A1    Jul. 19, 2018

(30) Foreign Application Priority Data

Jan. 19, 2017 (JP) ................................ 2017-007925

(51) Int. Cl.
*B23K 26/362* (2014.01)
*B23K 26/382* (2014.01)
(Continued)

(52) U.S. Cl.
CPC .......... *B23K 26/1464* (2013.01); *B23K 26/14* (2013.01); *B23K 26/142* (2015.10);
(Continued)

(58) Field of Classification Search
CPC ................ B23K 1/0053; B23K 26/064; B23K 26/0648; B23K 26/362–389; B23K 26/14–1494; B23K 26/16
See application file for complete search history.

(56) References Cited

U.S. PATENT DOCUMENTS 4,027,137 A *   5/1977   Liedtke ................ B23K 26/123
                                                             219/121.7
4,324,972 A *   4/1982   Furrer .................... B23K 26/02
                                                             219/121.63
(Continued)

FOREIGN PATENT DOCUMENTS

CN        101172321 A      5/2008
CN        102091869 A      6/2011
(Continued)

OTHER PUBLICATIONS

An Office Action mailed by the State Intellectual Property Office dated Feb. 19, 2019, which corresponds to Chinese Patent Application No. 201810050787.0 and is related to U.S. Appl. No. 15/874,466.
(Continued)

*Primary Examiner* — Michael A Laflame, Jr.
(74) *Attorney, Agent, or Firm* — Studebaker & Brackett PC

(57) ABSTRACT

To provide a laser machine capable of reliably drilling a small hole when drilling of the workpiece is performed. A laser machine 1 includes: a laser oscillator; a light guide path; a processing head; and a nozzle. The nozzle includes: a nozzle tip body that irradiates the workpiece with the laser beam; a charge port formed in the nozzle tip body; and an exhaust port formed in the nozzle tip body so as to oppose to the charge port. The nozzle supplies gas to the inside of the nozzle tip body along a gas flow path extending from the charge port to the exhaust port in a form of crossing across the laser beam in the nozzle tip body, to generate a negative pressure in the vicinity of an opening part of a tip end of the nozzle tip body.

7 Claims, 3 Drawing Sheets

(51) Int. Cl.
*B23K 26/38* (2014.01)
*B23K 26/16* (2006.01)
*B23K 26/14* (2014.01)
*B23K 26/21* (2014.01)
*B23K 26/142* (2014.01)

(52) U.S. Cl.
CPC .......... *B23K 26/1476* (2013.01); *B23K 26/21* (2015.10); *B23K 26/382* (2015.10)

(56) References Cited

U.S. PATENT DOCUMENTS

| | | | | |
|---|---|---|---|---|
| 5,237,150 | A * | 8/1993 | Karube | B23K 26/0643 219/121.72 |
| 6,530,317 | B2 * | 3/2003 | Gelbart | B41C 1/05 101/31.1 |
| 8,344,285 | B2 * | 1/2013 | Sykes | B23K 26/12 219/121.68 |
| 9,248,524 | B2 | 2/2016 | Kurosawa et al. | |
| 10,213,873 | B2 * | 2/2019 | Chen | B23K 26/0006 |
| 2004/0026383 | A1 * | 2/2004 | Zakel | B23K 1/018 219/121.6 |
| 2006/0249480 | A1 * | 11/2006 | Boyle | B23K 26/0648 216/63 |
| 2008/0210675 | A1 * | 9/2008 | Sasaki | B23K 26/1476 219/121.84 |
| 2013/0026144 | A1 | 1/2013 | Kurosawa et al. | |

FOREIGN PATENT DOCUMENTS

| | | |
|---|---|---|
| CN | 202317438 U | 7/2012 |
| DE | 3931401 A1 | 3/1991 |
| DE | 102005025119 A1 | 12/2005 |
| DE | 102006052292 A1 | 5/2008 |
| EP | 0712345 B1 | 1/1997 |
| JP | S59-223191 A | 12/1984 |
| JP | H01-107994 A | 4/1989 |
| JP | H01-114187 U | 8/1989 |
| JP | H08-510691 A | 11/1996 |
| JP | H09-164495 A | 6/1997 |
| JP | 2001-150176 A | 6/2001 |
| JP | 2008-119698 A | 5/2008 |
| JP | 2013-027907 A | 2/2013 |
| JP | 2016-538421 A | 12/2016 |

OTHER PUBLICATIONS

An Office Action mailed by the Japanese Patent Office dated Jul. 24, 2018, which corresponds to Japanese Patent Application No. 2017-007925 and is related to U.S. Appl. No. 15/874,466.

An Office Action mailed by the State Intellectual Property Office of the People's Republic of China dated Sep. 2, 2019, which corresponds to Chinese Patent Application No. 201810050787.0 and is related to U.S. Appl. No. 15/874,466; with English language translation.

An Office Action mailed by the German Patent Office dated Oct. 10, 2019, which corresponds to German Patent Application No. 102018000442.3 and is related to U.S. Appl. No. 15/874,466; with partial English translation.

* cited by examiner

LASER MACHINE

This application is based on and claims the benefit of priority from Japanese Patent Application No. 2017-007925, filed on 19 Jan. 2017, the content of which is incorporated herein by reference.

BACKGROUND OF THE INVENTION

Field of the Invention

The present invention relates to a laser machine.

Related Art

Conventionally, when drilling is performed by using a laser machine, in order to blow away and remove a melted material generated in a laser light received area of a workpiece, and accelerate combustion of the workpiece, assist gas such as nitrogen and oxygen is blown to the laser light received area of the workpiece coaxially with a laser beam (refer to Patent Document 1 as an example).

Patent Document 1: Japanese Unexamined Patent Application, Publication No. 2013-27907

SUMMARY OF THE INVENTION

However, this is inconvenient as follows.

First, there is a risk that, when a small hole is opened, due to influence of the assist gas, not only the laser received area of the workpiece but also a peripheral region thereof is deformed or removed by thermal conduction from the melted material, and the hole diameter becomes larger than that is intended.

Second, when the workpiece is thick or high in specific gravity (hereinafter, referred to as "when the workpieces is thick, or the like"), in a process of drilling by laser processing, the melted material becomes difficult to be removed and drilling takes much time.

Third, in drilling of the workpiece, the laser received area of the workpiece is heated suddenly, and the temperature of the workpiece exceeds instantaneously the melting point and the boiling point. Thus, the melted material splashes to a laser irradiating direction and contaminates an optical system such as a lens and a window.

In consideration with such circumstance, the present invention has an object to provide a laser machine capable of reliably drilling a small hole in a workpiece when drilling of the workpiece is performed, capable of reducing drilling time even when the workpiece is thick, or the like, and capable of preventing an optical system from being contaminated by a melted material.

(1) A laser machine (for example, a laser machine 1 described later) according to the present invention includes: a laser oscillator (for example, a laser oscillator 5 described later) that emits a laser beam (for example, a laser beam LB described later); a light guide path (for example, a light guide path 6 described later) that guides the laser beam emitted from the laser oscillator to the workpiece (for example, a workpiece 3 described later); a processing head (for example, a processing head 8 described later) that focuses the laser beam by an optical system (for example, a focusing lens 7, a window, described later) and irradiates the workpiece with the laser beam; and a nozzle (for example, a nozzle 2 described later) mounted to a tip end of the processing head. The nozzle includes: a nozzle tip body (for example, a nozzle tip body 21 described later) that irradiates the workpiece with the laser beam; a charge port (for example, a charge port 22 described later) formed in the nozzle tip body; and an exhaust port (for example, an exhaust port 23 described later) formed opposing to the charge port. The nozzle is configured to supply gas (for example, gas G described later) to the inside of the nozzle tip body along a gas flow path extending from the charge port to the exhaust port in a form of crossing across the laser beam in the nozzle tip body, to generate a negative pressure in the vicinity of an opening part (for example, an opening part 21a described later) of a tip end of the nozzle tip body.

(2) In the laser machine of (1), in the nozzle, a diameter (for example, a diameter D2 described later) of the charge port is a diameter (for example, a diameter D1 described later) in a portion across which the gas of the laser beam in the nozzle tip body crosses, or more. A diameter (for example, a diameter D3 described later) of the exhaust port may be larger than the diameter of the charge port.

(3) In the laser machine of (1) or (2), when the gas is supplied along the gas flow path, the nozzle may cause a melted material (for example, a melted material 10 described later) to apply a suction force of the weight of the melted material or more. This melted material is sucked from the opening part, and discharged from the nozzle exhaust port, together with the gas flown from a suction port to the exhaust port.

(4) In the laser machine of any of (1) to (3), a gas layer (for example, a gas layer 11 described later) that prevents the gas from intruding between the optical system and the gas flow path, so that the gas supplied along the gas flow path does not reach the optical system.

(5) In the laser machine of any of (1) to (4), the nozzle may be provided with an opening and closing valve (for example, an opening and closing valve 12 described later) that blocks exhaust of the gas supplied along the gas flow path.

(6) In the laser machine of any of (1) to (5), the nozzle is attached with a decompressor (for example, an exhaust pump 29 described later) that decompresses the inside of the nozzle tip body.

(7) In the laser machine of any of (1) to (6), in the nozzle, the tip end of the nozzle tip body is provided with the elastic member (for example, an elastic member 30 described later) that contacts with the workpiece and improves the degree of enclosure of the nozzle tip body by the workpiece.

By the present invention, when drilling of a workpiece is performed by using a laser machine, by gas flow crossing across the laser beam, a negative pressure is generated in a laser received area of the workpiece, and a melted material is sucked and removed. As a result, a small hole can be reliably drilled in the workpiece, and drilling time can be reduced even when the workpiece is thick, or the like. Further, an optical system can be prevented from being contaminated by the melted material.

DETAILED DESCRIPTION OF THE INVENTION

Following describes embodiments of the present invention with reference to drawings.

First Embodiment

Figure 1:
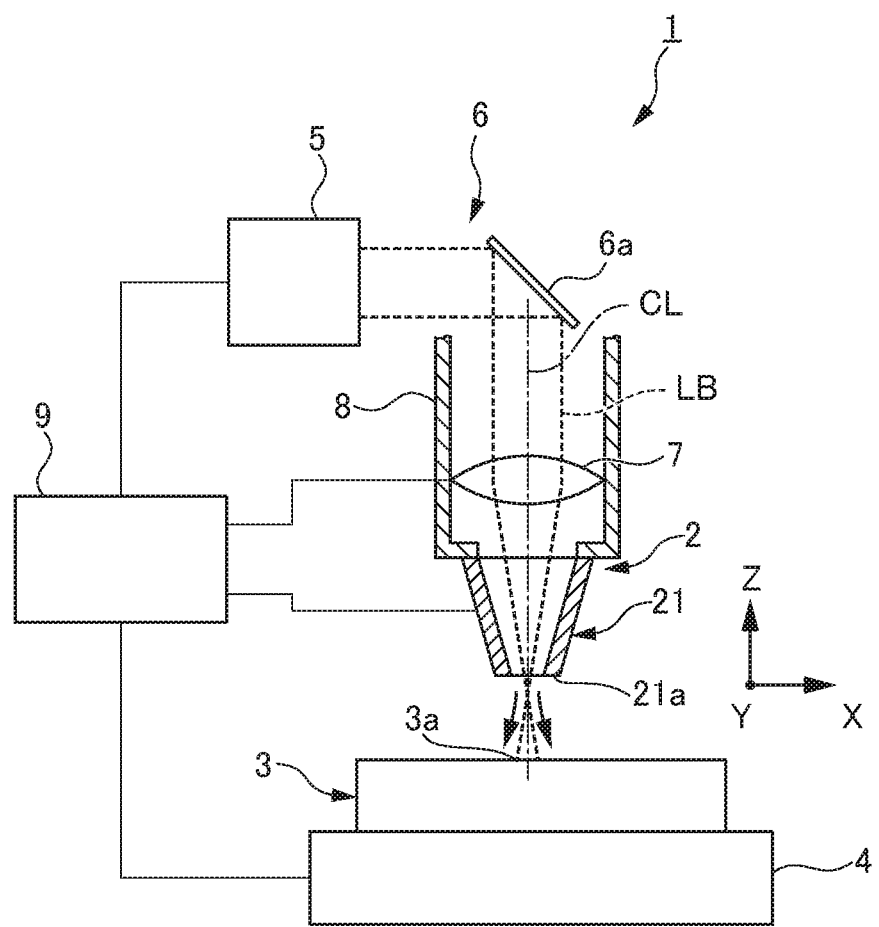
FIG. 1 is a schematic configuration diagram showing a laser machine according to a first embodiment of the present invention.
Figure 2:
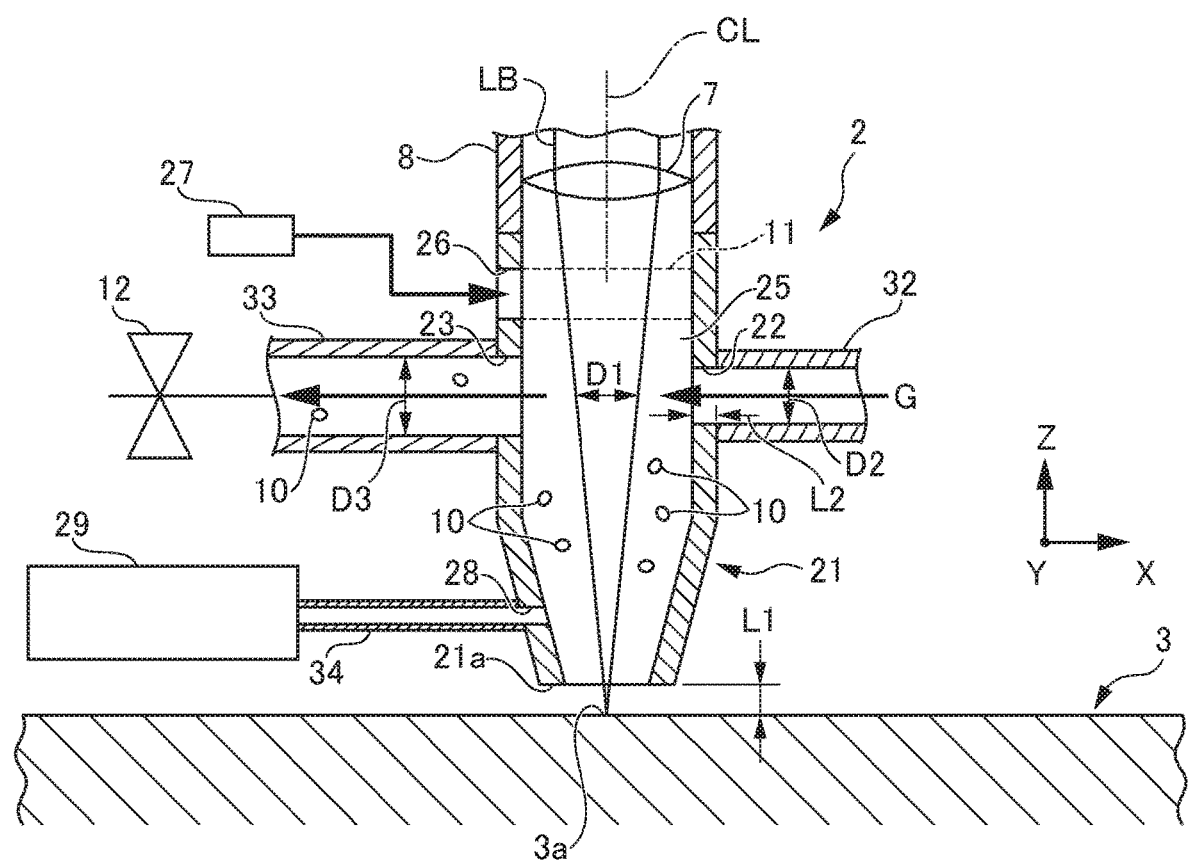
FIG. 2 is a vertical cross section view showing a nozzle of the laser machine according to the first embodiment of the present invention.

FIG. 1 is a schematic configuration diagram showing a laser machine according to a first embodiment. FIG. 2 is a vertical cross section view showing a nozzle of the laser machine according to the first embodiment.

As shown in FIG. 1, a laser machine 1 according to the first embodiment includes: a movable table 4 that horizontally supports a flat plate-shaped workpiece 3 of aluminum; a laser oscillator 5 that emits a laser beam LB having a circular cross section; a light guide path 6 that guides the laser beam LB emitted from the laser oscillator 5 to the workpiece 3; a processing head 8 that focuses the laser beam LB by a focusing lens 7 and irradiates the workpiece 3 with the laser beam LB; a nozzle 2 mounted to a tip end of the processing head 8; and a controller 9 that controls operation of the movable table 4, the laser oscillator 5, and the processing head 8.

The movable table 4 is movable to an X axis direction and a Y axis direction. The processing head 8 is movable to a Z axis direction. The focusing lens 7 is fixed to the inside of the processing head 8. The light guide path 6 includes a reflector 6a that reflects the laser beam LB emitted from the laser oscillator 5, to guide the laser beam LB to the focusing lens 7. The type of the laser beam LB is not limited particularly. For example, the laser beam LB may be used a carbon dioxide gas laser, a fiber laser, a direct diode laser, and a YAG laser. When the fiber laser is used, the laser beam is emitted from an optical fiber having a core diameter of 100 μm, by a laser command output of 4 kW, a frequency of 100 Hz, and a duty of 10%, and the flat plate-shaped workpiece 3 of aluminum having a thickness of 10 mm is irradiated with the fiber laser. In this case, laser irradiation of 1 millisecond and laser stop of 9 milliseconds are repeated.

As shown in FIG. 2, the nozzle 2 includes: a substantially nozzle tip body 21 that irradiates the workpiece 3 with the laser beam LB; a charge port 22 formed in the nozzle tip body 21; and an exhaust port 23 formed in the nozzle tip body 21 so as to oppose to the charge port 22. The charge port 22 is connected with a cylindrical charge tube 32. The exhaust port 23 is connected with a cylindrical exhaust tube 33. The nozzle 2 is configured to supply gas G to the inside of the nozzle tip body 21 along a linear gas flow path 25 extending from the charge port 22 to the exhaust port 23 in a form of crossing across the laser beam LB in the nozzle tip body 21, to generate a negative pressure in the vicinity of an opening part 21a of a tip end of the nozzle tip body 21.

As shown in FIG. 2, a diameter D2 of the charge port 22 is a diameter D1 in a portion across which the gas G of the laser beam LB in the nozzle tip body 21 crosses, or more (D2≥D1). A diameter D3 of the exhaust port 23 is larger than the diameter D2 of the charge port 22 (D3>D2). For example, it is defined that D3=5 mm, and D2=1 mm. The charge port 22 has a linear portion of a predetermined length L2 (for example, 1 mm) for improving linearity of the gas G. The exhaust tube 33 is attached with an opening and closing valve 12 that blocks exhaust of the gas G supplied along the gas flow path 25.

The nozzle 2 is configured to, when the gas G is supplied along the gas flow path 25, for example, adjust the pressure and the flow rate of the gas G, appropriately, to cause the melted material 10 generated according to the drilling of the workpiece 3 to apply a suction force of the weight of the melted material 10 or more. The melted material 10 is sucked from the opening part 21a of the nozzle tip body 21, and discharged to the outside of the nozzle tip body 21 from the exhaust port 23.

The nozzle 2 is formed with a gas supply port 26 in an upper side of the exhaust port 23 so that the inside and outside of the nozzle tip body 21 communicate with each other. The gas supply port 26 is connected with a gas supply part 27. The nozzle 2 is configured so that, inert gas such as nitrogen is supplied from the gas supply part 27 via the gas supply port 26 to the inside of the nozzle tip body 21, and thereby, a gas layer 11 that prevents the gas G from intruding between the focusing lens 7 and the gas flow path so that the gas G supplied along the gas flow path 25 does not reach the focusing lens 7.

The nozzle 2 is formed with a gas exhaust port 28 in the vicinity of the opening part 21a of the nozzle tip body 21, so that the inside and outside of the nozzle tip body 21 communicate with each other. The gas exhaust port 28 is connected with an exhaust pump 29 as a decompressor via the exhaust tube 34. The exhaust pump 29 is driven, the gas in the inside of the nozzle tip body 21 is sucked from the gas exhaust port 28, and thereby, the pressure of the inside of the nozzle tip body 21 is reduced, and the pressure in the vicinity of the opening part 21a can be negative pressure. A filter (not shown) is mounted to the gas exhaust port 28, and the nozzle 2 has a structure in which the melted material 10 is not sucked from the gas exhaust port 28 to the exhaust pump 29 side.

The laser machine 1 has a configuration as described above. Drilling of the flat plate-shaped workpiece 3 of aluminum by using the laser machine 1 is performed by following procedures.

First, as shown in FIG. 1, in a state where the workpiece 3 is placed on the movable table 4, according to the command from the controller 9, the movable table 4 is moved as appropriate to the X axis direction and the Y axis direction, and the workpiece 3 is positioned in a predetermined position of the X axis direction and the Y axis direction.

Next, according to the command of the controller 9, the processing head 8 is moved as appropriate to the Z axis direction, and the nozzle 2 is positioned in a predetermined position of the Z axis direction. Then, as shown in FIG. 2, in the nozzle 2, the opening part 21a of the nozzle tip body 21 is apart upward from the surface of the workpiece 3 for a predetermined distance L1 (for example, L1=0.5 mm to 5 mm).

Next, according to the command from the controller 9, the opening and closing valve 12 is opened, and the gas G is supplied in a predetermined pressure (for example, 0.5 MPa), to the inside of the nozzle tip body 21 along the gas flow path 25 extending from the charge port 22 to the exhaust port 23. Then, the gas in the inside of the nozzle tip body 21 is exhausted by being caught by the flow of the gas G. Thus, a negative pressure is generated in the vicinity of the opening part 21a of the nozzle tip body 21.

At this time, the exhaust port 23 opposes to the charge port 22, the diameter D3 of the exhaust port 23 is larger than the diameter D2 of the charge port 22, and the linear portion of the predetermined length L2 that improves linearity of the gas G is provided in the charge port 22. Thus, the gas G supplied from the charge port 22 to the inside of the nozzle tip body 21 is entirely exhausted from the exhaust port 23. As a result, unnecessary supply of the gas G does not occur, and generation of the negative pressure can be performed efficiently.

According to the command from the controller 9, inert gas is supplied from the gas supply part 27, via the gas supply port 26, to the inside of the nozzle tip body 21. Then, the gas layer 11 is formed between the focusing lens 7 and the gas flow path 25.

In order to assist the generation of the negative pressure by the supply of the gas G, according to the command from the controller 9, the exhaust pump 29 is driven to suck the gas in the inside of the nozzle tip body 21 from the gas exhaust port 28. Then, the pressure in the inside of the nozzle tip body 21 is reduced, and the pressure in the vicinity of the opening part 21a of the nozzle tip body 21 becomes further negative.

In this state, according to the command from the controller 9, the laser beam LB is emitted from the laser oscillator 5. Then, the laser beam LB is guided along the light guide path 6 and is focused by the focusing lens 7, and the workpiece 3 is irradiated with the laser beam LB from the opening part 21a of the nozzle tip body 21 of the nozzle 2. As a result, in the workpiece 3, a laser received area 3a of the workpiece 3 is melted by the laser irradiation of the laser beam LB, and drilling starts.

At this time, according to the drilling of the workpiece 3, the laser received area 3a of the workpiece 3 is heated and melted by laser. When an energy amount supplied to the laser received area 3a is large, the temperature of the laser received area 3a instantaneously exceeds the boiling point, the melted material 10 is generated in the laser received area 3a, and the melted material 10 splashes to the coaxial direction of the laser beam LB. However, the gas G flows in the nozzle 2 so as to cross across the laser beam LB. Thus, the melted material 10 is prevented from reaching the focusing lens 7, and the focusing lens 7 can be protected. In addition, in the nozzle 2, the pressure in the vicinity of the opening part 21a of the nozzle tip body 21 is negative pressure due to the flow of the gas G crossing across the optical axis CL of the laser beam LB. Thus, a negative pressure is generated also in this laser received area 3a. In addition, the gas G is supplied so that a suction force of the weight of the melted material 10 or more acts. As a result, the melted material 10 is exhausted from the exhaust port 23 to the outside of the nozzle tip body 21 while sucking to the inside of the nozzle tip body 21 and cooling. Accordingly, the melted material 10 is not accumulated in the inside of the nozzle tip body 21 to disturb the irradiation of the laser beam LB. Thus, the drilling of the workpiece 3 can be performed efficiently.

In this way, when the drilling of the workpiece 3 is performed by using the laser machine 1, by the flow of the gas G crossing across the optical axis CL of the laser beam LB, the negative pressure is generated in the laser received area 3a of the workpiece 3, and the melted material 10 can be sucked and removed. By this instantaneous removal of the melted material 10, a heat flow from the melted material 10 to a base material by heat conduction can be reduced. Thus, the temperature in a portion of the workpiece 3 other than the laser received area 3a can be prevented from increasing. As a result, a small hole can be reliably drilled only in the laser received area 3a of the workpiece 3, and drilling time can be reduced even when the workpiece 3 is thick, or the like. Even when the temperature of the laser received area 3a of the workpiece 3 suddenly increases at the time of laser irradiation, a phenomenon such as sudden boiling occurs, and the melted material 10 splashes to the laser irradiation direction, the melted material is flown to the exhaust port 23 together with the gas G by the flow of the gas G crossing across the optical axis CL of the laser beam LB. Thus, the focusing lens 7 can be prevented from being contaminated by the melted material 10.

Since the gas layer 11 is formed between the focusing lens 7 and the gas flow path 25, even when the gas G supplied along the gas flow path 25 attempts to intrude in the focusing lens 7 side, intrusion of the gas G is prevented in the gas layer 11, and the gas G does not reach the focusing lens 7. Accordingly, even when factory air including oil content is used as the gas G, the focusing lens 7 can be prevented beforehand from being contaminated by the oil content. Thus, the allowable range of the gas G can be increased to increase usability of the nozzle 2.

When the drilling of the workpiece 3 is finished in this way, since the laser received area 3a of the workpiece 3 extends through from the surface of the workpiece 3 to the rear surface, the melted material 10 of the workpiece 3 can be discharged downward from the rear surface of the workpiece 3. Accordingly, after that, there is no need for sucking the melted material 10 of the workpiece 3. Thus, cutting of the workpiece 3 can be performed while the opening and closing valve 12 is closed to block the exhaust of the gas G, and assist gas is supplied from the nozzle 2.

Modification of First Embodiment

Figure 3:
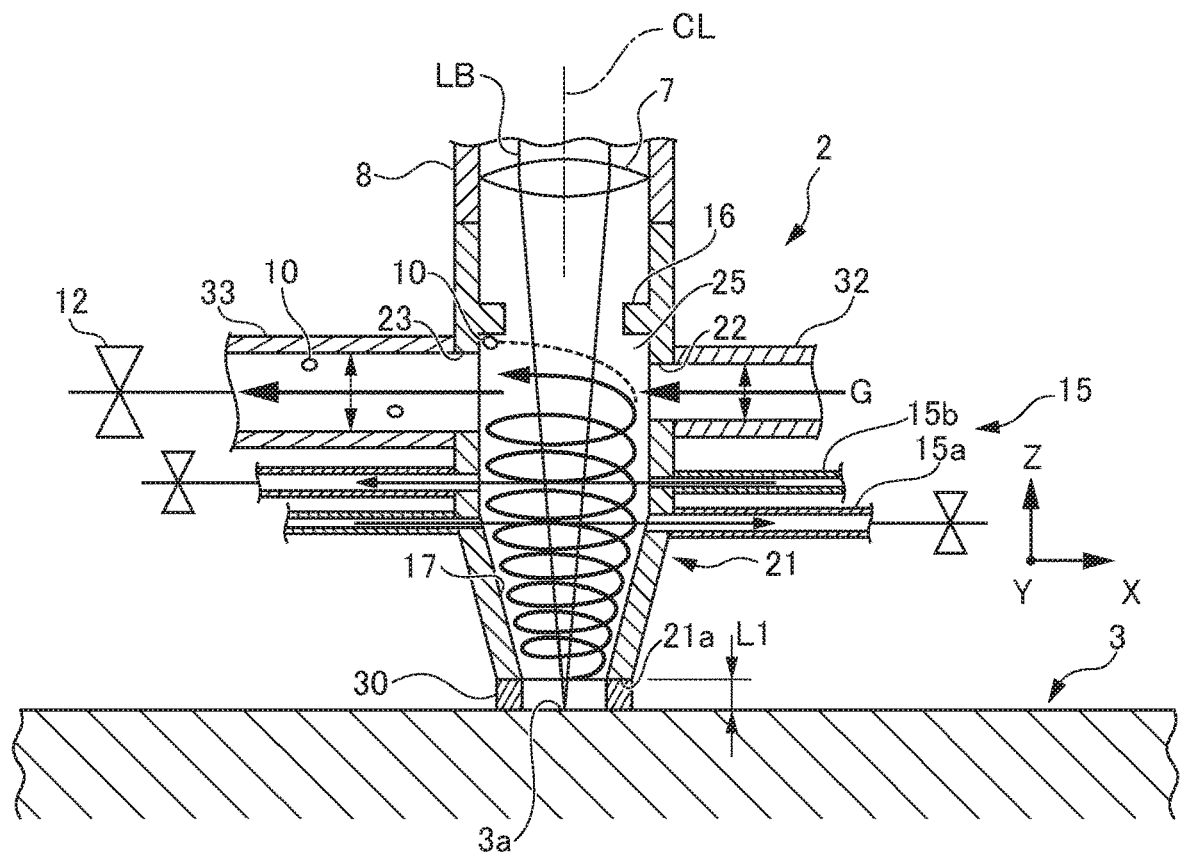
FIG. 3 is a vertical cross section view showing the nozzle of a laser machine according to a modification of a first embodiment of the present invention.
Figure 4:
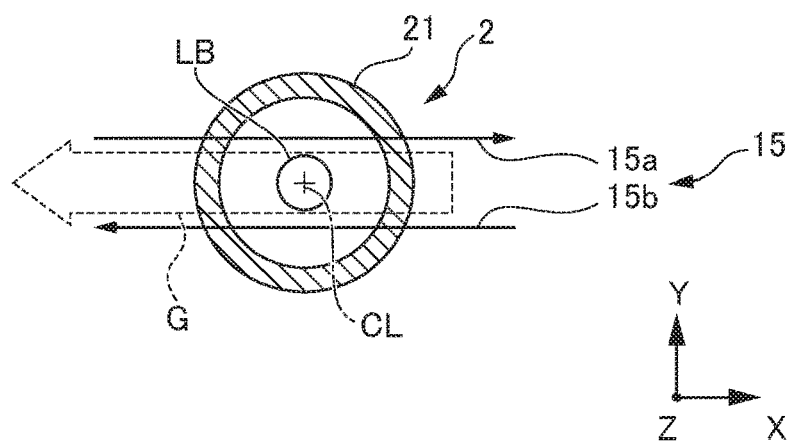
FIG. 4 is a horizontal cross section view showing the nozzle of the laser machine according to the modification of the first embodiment of the present invention.

FIG. 3 is a vertical cross section view showing the nozzle of a laser machine according to a modification of a first embodiment. FIG. 4 is a horizontal cross section view showing the nozzle of the laser machine according to the modification of the first embodiment.

The laser machine 1 according to this modification of the first embodiment has a different configuration of the nozzle 2 from that of the first embodiment described above, as follows. Other configurations are basically similar to those of the first embodiment described above. Thus, the same members are added with the same numerals, and description thereof is omitted.

As shown in FIG. 3 and FIG. 4, in the nozzle 2 of this laser machine 1, an airflow generator 15 that generates a helical rising airflow in the inside of the nozzle tip body 21 is attached to the nozzle tip body 21. This airflow generator 15 is composed of a first gas path 15a that sends air substantially horizontally from the outside of the nozzle tip body 21, via the inside of the nozzle tip body 21, to the outside, and a second gas path 15b that is installed in almost parallel with the first gas path 15a, and sends air substantially horizontally from the outside of the nozzle tip body 21, via the inside of the nozzle tip body 21, to the outside. The first gas path 15a and the second gas path 15b are opposed to each other by sandwiching an optical axis CL of the laser beam LB, in the lower part of the gas flow path 25, in a state of being offset from each other to the axial center direction of the nozzle tip body 21 (That is, the parallel direction with the optical axis CL of the laser beam LB).

As shown in FIG. 3, in the inside of the nozzle tip body 21, a ring-shaped folding back part 16 for preventing a melted material 10 of the workpiece 3 is installed above the gas flow path 25 along the inner circumferential surface of the nozzle tip body 21.

The inner circumferential surface of the nozzle tip body 21 is applied with an adhesion inhibiting coating 17 for decreasing adhesiveness (wettability) of the melted material 10 of the workpiece 3 to the inner circumferential surface. This adhesion inhibiting coating 17 may be a material having excellent heat resistance, including, a fluorine resin (for example, Teflon (registered trade mark) from DuPont) as a representative example.

In the nozzle 2, the tip end of the nozzle tip body 21 is attached with a cylindrical elastic member 30 that improves the degree of enclosure of the nozzle tip body 21 by contacting with the workpiece 3. This elastic member 30 is configured to contact with the workpiece 3 while elastically extending and contracting in the axial direction of the nozzle tip body 21. When a material that transmits electricity (for example, a metal having a spring property, and a conductive polymer) is adopted as a material of the elastic member 30, a distance between the workpiece 3 and the nozzle 2 can be measured by using a general electrostatic capacitance sensor.

Accordingly, in the present modification, in drilling of the workpiece 3, in addition to the effect that the melted material 10 can be sucked by the negative pressure to be discharged from the exhaust port 23 of the nozzle 2 to the outside of the nozzle tip body 21, by the flow of the gas G crossing across the optical axis CL of the laser beam LB, as similar to the first embodiment described above, following effect can be exhibited.

First, the airflow generator 15 can generate the helical rising airflow in the inside of the nozzle tip body 21. Thus, the melted material 10 can be sucked efficiently by carrying the melted 10 by this rising airflow. As a result, discharge of the melted material 10 can be performed more smoothly.

By the folding back part 16 installed in the inside of the nozzle tip body 21, the melted material 10 can be prevented from rising along the inner circumferential surface of the nozzle tip body 21. Accordingly, even when this melted material 10 has a large momentum, and cannot be guided to the exhaust port 23 of the nozzle 2 by the flow of the gas G, inconvenience that the melted material 10 reaches the focusing lens 7 and contaminates the focusing lens 7 does not occur. Even when this melted material 10 has only a small momentum, and cannot be discharged from the exhaust port 23 of the nozzle 2 as the locus shown in FIG. 3 by a broken line, by being sucked by the flow of the gas G, the inconvenience that the melted material 10 reaches the focusing lens 7 and contaminates the focusing lens 7 does not occur.

In the nozzle 2, since the adhesion inhibiting coating 17 is applied to the inner circumferential surface of the nozzle tip body 21, the melted material 10 can be prevented beforehand, from adhering and depositing to the inner circumferential surface of the nozzle tip body 21. As a result, the irradiation of the laser beam LB can be performed enough for a long time.

In the nozzle 2, the elastic member 30 is provided in the tip end of the nozzle tip body 21 so as to contact with the workpiece 3. Thus, the degree of enclosure of the nozzle tip body 21 by the workpiece 3 is improved. Therefore, the negative pressure of the laser received area 3a of the workpiece 3 can be increased significantly, and the sucking force of the melted material 10 can be greatly increased.

Further, this elastic member 30 is configured to contact with the workpiece 3 while elastically extending and contracting in the axial center direction of the nozzle tip body 21. Thus, a load is not applied to the workpiece 3. Accordingly, while the workpiece 3 is prevented from being damaged such as deforming and cracking, the drilling of the workpiece 3 can be performed smoothly.

The present invention is not limited to the first embodiment and the modification thereof. Variation and modification in the scope in which the object of the present invention can be achieved are included in the present invention.

For example, in the first embodiment and the modification thereof, a case where only the focusing lens 7 is included as the optical system in the processing head 8. However, even when a window (not shown) as an optical system that protects the focusing lens 7 is attached in the lower part of the focusing lens 7, the present invention can be similarly applied.

In the first embodiment and the modification thereof described above, a case where the focusing lens 7 is fixed to the processing head 8 is described. However, even when the focusing lens 7 is movable to the Z axis direction in the processing head 8, the present invention can be similarly applied.

In the first embodiment and the modification thereof described above, a case where the laser processing of the workpiece 3 of aluminum is performed is described. However, even when laser processing of a workpiece formed of other materials than aluminum is performed, the present invention can be similarly applied.

EXPLANATION OF REFERENCE NUMERALS

1 Laser machine
2 Nozzle
3 Workpiece
5 Laser oscillator
6 Light guide path
7 Focusing lens (optical system)
8 processing head
10 Melted material
11 Gas layer
12 Opening and closing valve
21 Nozzle tip body
21a Opening part
22 Charge port
23 Exhaust port
25 Gas flow path
29 Exhaust pump (decompressor)
30 Elastic member
D1 Diameter of laser beam
D2 Diameter of charge port
D3 Diameter of exhaust port
G Gas
LB Laser beam

What is claimed is:
1. A laser machine comprising:
a laser oscillator that emits a laser beam;
a light guide path that guides the laser beam emitted from the laser oscillator to the workpiece;
a processing head that focuses the laser beam by a lens and irradiates the workpiece with the laser beam; and
a nozzle mounted to a tip end of the processing head,
the nozzle including a nozzle tip body that irradiates the workpiece with the laser beam, a charge port formed in the nozzle tip body, and an exhaust port formed opposing to the charge port in the nozzle tip body,
the nozzle being configured to supply gas to the inside of the nozzle tip body along a gas flow path extending from the charge port to the exhaust port in a form of crossing across the laser beam in the nozzle tip body, to cause a melted material generated by irradiating the workpiece with a laser beam to apply a suction force equal to or greater than the weight of the melted material, and to generate a negative pressure in the vicinity of an opening part of a tip end of the nozzle tip body.

2. The laser machine according to claim 1, wherein, in the nozzle, a diameter of the charge port is a diameter in a portion across which the gas of the laser beam in the nozzle tip body crosses, or more, and a diameter of the exhaust port is larger than the diameter of the charge port.

3. The laser machine according to claim 1, wherein a gas layer that prevents the gas from intruding is formed between the lens and the gas flow path, so that the gas supplied along the gas flow path does not reach the lens.

4. The laser machine according to claim 1, wherein the nozzle is provided with an opening and closing valve that blocks exhaust of the gas supplied along the gas flow path.

5. The laser machine according to claim 1, wherein the nozzle is attached with a decompressor that decompresses the inside of the nozzle tip body.

6. The laser machine according to claim 1, wherein the nozzle is configured to cause the melted material to be sucked from the opening part of the tip end of the nozzle tip body and discharged to the outside of the nozzle tip body from the exhaust port, and the tip end of the nozzle tip body is provided with an elastic member that contacts with the workpiece and improves the degree of enclosure of the nozzle tip body by the workpiece.

7. The laser machine according to claim 1, the nozzle tip body further comprising:
   a cylindrical portion adjacent to the processing head; and
   a tapered portion disposed on a tip end portion of the cylindrical portion, wherein
   the charge port and the exhaust port are provided in the cylindrical portion, and
   a gas exhaust port, which is connected to an exhaust pump, is formed in the tapered portion such that material from the workpiece is not discharged to the exhaust pump.

* * * * *